Oct. 13, 1964 W. J. KINDERMAN 3,153,210
ELECTRICAL PRESSURE TRANSDUCER
Filed July 1, 1958 4 Sheets-Sheet 1

INVENTOR
WALTER J. KINDERMAN
BY
ATTORNEYS

Oct. 13, 1964  W. J. KINDERMAN  3,153,210
ELECTRICAL PRESSURE TRANSDUCER
Filed July 1, 1958  4 Sheets-Sheet 3

INVENTOR
WALTER J. KINDERMAN
BY
ATTORNEYS

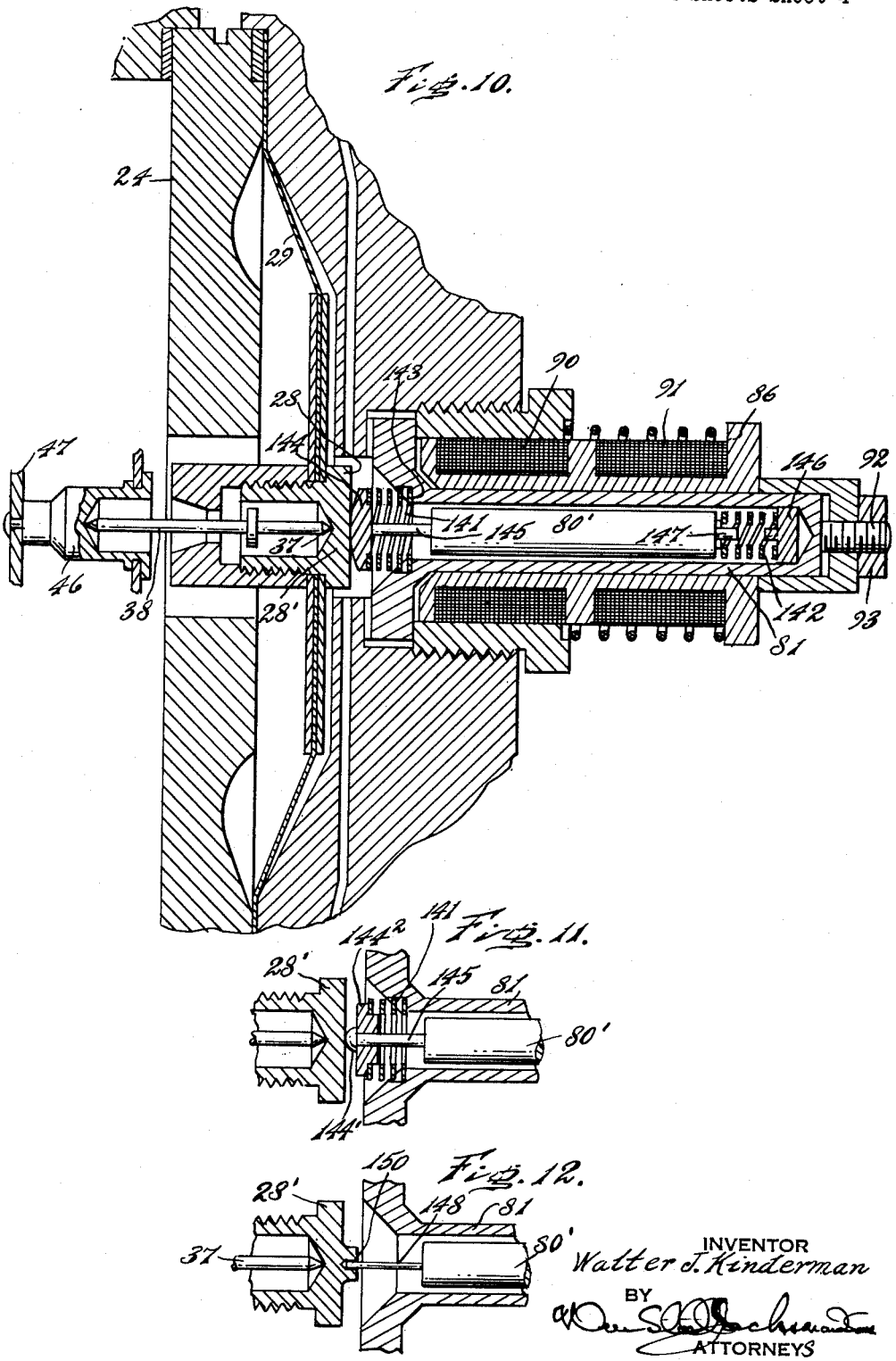

ELECTRICAL PRESSURE TRANSDUCER

Walter J. Kinderman, Philadelphia, Pa., assignor to Yarnall-Waring Company, Philadelphia, Pa., a corporation of Pennsylvania
Filed July 1, 1958, Ser. No. 745,857
7 Claims. (Cl. 336—30)

The present invention relates to differential pressure indicators of the character which are useful for liquid level gauges, pressure gauges, flow meters and the like.

A purpose of the invention is to produce a remote electrical response to the motion of the diaphragm of a differential pressure gauge without creating an undesirable load on the diaphragm or causing substantial change in the plane of the center of the diaphragm with diaphragm motion.

A further purpose is to minimize the mechanical contacts and moving parts which could introduce friction in a differential pressure gauge.

A further purpose is to increase the reliability and reduce the maintenance on a differential pressure gauge.

A further purpose is to permit ready access to electrical components outside the gauge housing.

A further purpose is to avoid the possibility of bearing interference due to suspended matter or dirt.

A further purpose is to balance the components which are supported on the diaphragm, including the armature which moves through the electrical coil means.

A further purpose is to place the center of gravity of the components supported on the diaphragm in the vertical plane of the center of the diaphragm.

A further purpose is to permit a slight compensating moment of the diaphragm in case slight unbalance occurs from any cause.

A further purpose is to spring suspend the magnetic core so that it will follow the diaphragm but will not necessarily be rigidly mounted thereon.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

FIGURE 10 is a fragmentary view similar to FIGURE 3 showing a modification of the suspension of the magnetically susceptible core.

FIGURES 11 and 12 are fragmentary views similar to FIGURE 10 showing further variations.

Figure 2:
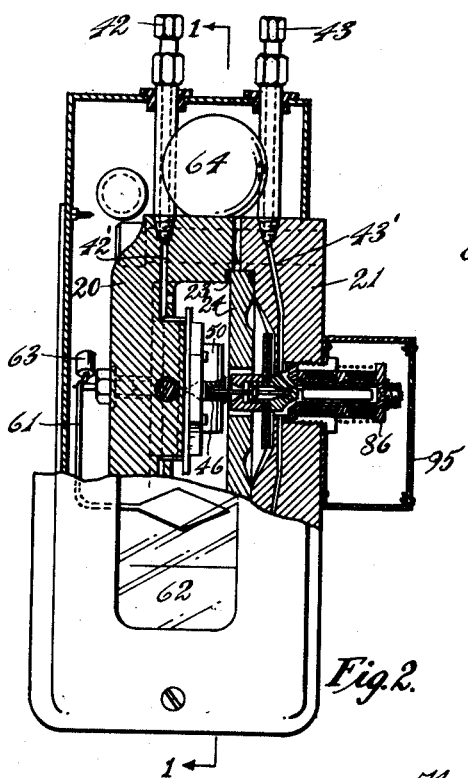
FIGURE 2 is a section of FIGURE 1 on the line 2—2, with the lower portion of the view shown in elevation.
Figure 1:
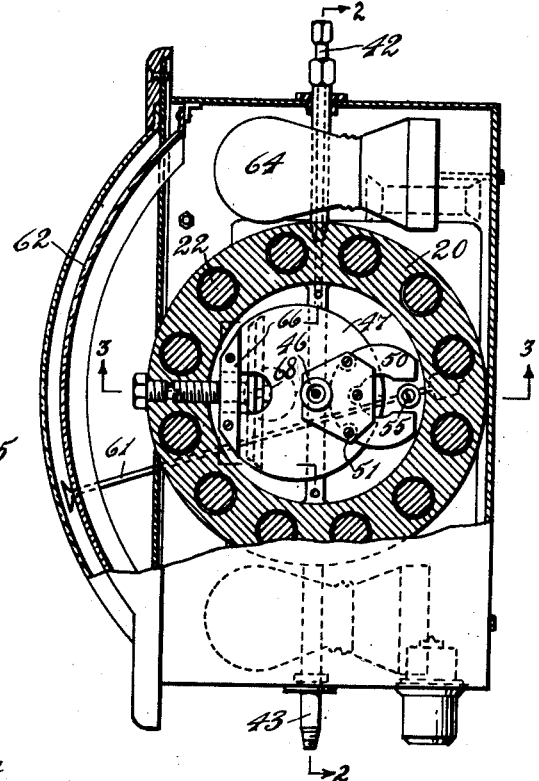
FIGURE 1 is a section of the differential pressure gauge or indicator of the invention on the line 1—1 of FIGURE 2. This view is in effect a central vertical section.
Figure 3:
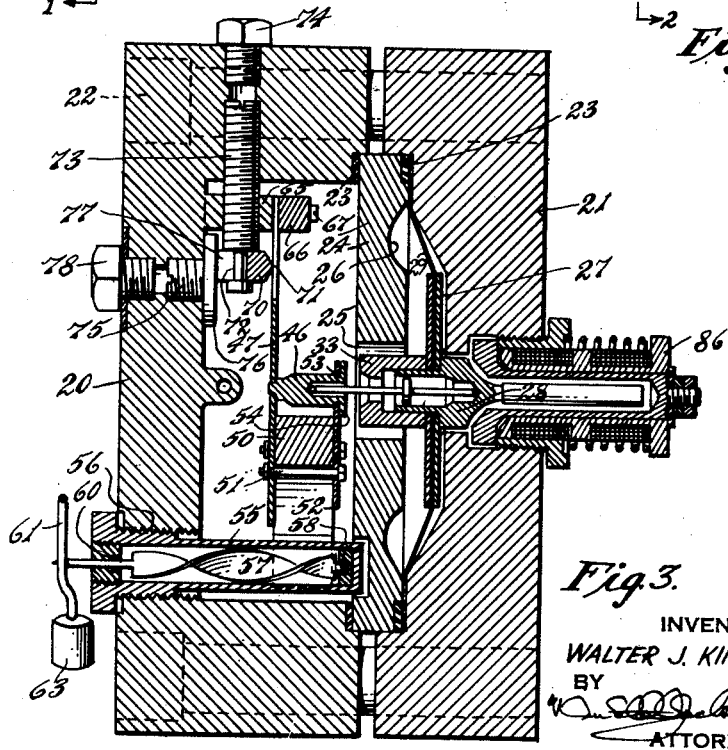
FIGURE 3 is a section of FIGURE 1 on the line 3—3.
Figure 4:
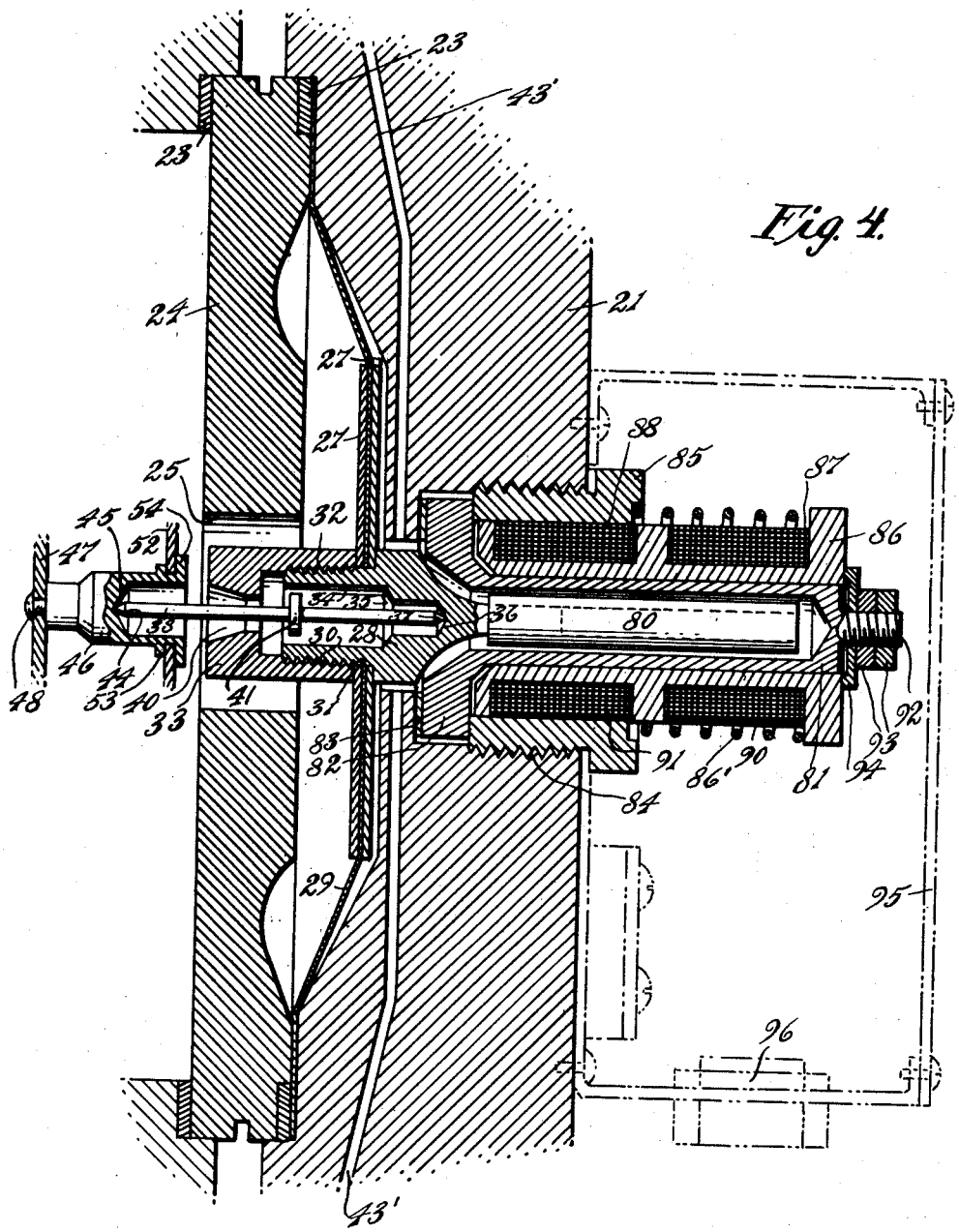
FIGURE 4 is an enlarged fragmentary sectional view similar to FIGURE 3, showing additional detail.

Describing in illustration but not in limitation and referring to the drawings:

In my United States Patent No. 2,509,644, granted May 30, 1950, for Differential Pressure Gauge, I illustrate a gauge having a flexible diaphragm which is connected to a source of pressure at the two sides (one of which is a standard) and indicates liquid level, pressure difference, flow, or the like. The present invention constitutes a further development of the subject matter of my patent aforesaid, to permit direct electrical response to the motion of the diaphragm, while at the same time also permitting operation of a pointer.

In the device of my patent, a spring mounts the magnet and connects by a pin, having pin bearings at the opposite ends, with a central diaphragm fitting. The diaphragm fitting has a well which permits the pin bearing on the end of the pin adjoining the diaphragm to engage at a point beyond the plane of the diaphragm. This contributes stability to the diaphragm movement and minimizes differential head effect between the top and bottom liquid level gauge positions of the diaphragm.

In accordance with the present invention, a suitably cylindrical armature of magnetically susceptible material extends away from the spring and magnet, and is surrounded by a nonmagnetic envelope and then by electromagnetic coils.

This has several advantages. In the first place there is minimum mechanical contact and moving parts to minimize retarding friction.

In the second place the device is very simple so that reliability and low maintenance are obtained. The cost of the device is low and the cost of service is low.

The differential electric coils are accessible outside of the housing.

No bearings are added which could clog in the presence of suspended matter or dirt.

The arrangement of the pin bearings stabilizes the diaphragm position notwithstanding the presence of the armature for the coils, and tends to keep the space relation of the armature backing plate uniform at all circumferential points with respect to the backing surfaces. This is accomplished by affording the lowest energy conditions where the highest pressure is on the side of the diaphragm remote from the magnet and spring, which is normal condition.

The system is very advantageous also because of its ability to take care of any unbalanced moments due to the compensation effect of the shift from diaphragm parallelism with the backing plate relations. A relatively small angular shift introduces a large correction which favors good performance in spite of unbalance.

An important feature of the invention is that the center of gravity of the vertically positioned diaphragm assembly including the diaphragm plates and diaphragm fitting and armature is located in the vertical plane of the middle of the diaphragm. Under this condition the weight of the diaphragm assembly slightly lowers the center of the diaphragm but this is readily corrected by positioning the center of the diaphragm initially a corresponding amount higher than it otherwise would be.

Thus the diaphragm assembly will move in axial relationship along all points on the axis.

A slight unbalance from any cause is subject to a compensating moment with relatively slight departure from axial alignment.

The drop of the center of the diaphragm below the true axis is compensated by elevating the diaphragm initially an equivalent amount as just explained.

If the diaphragm is pivoted at its center and in the plane of its center, the increments of displacement will be symmetrical about the center line within the area of the backing plates. On this basis the displacement energy with respect to the differential pressure effective across the diaphragm will remain equal, with rotation about the central axis of the diaphragm, thus permitting movement out of parallelism with the backing plate.

In some cases, as later explained, it is desirable to provide spring mounting for the magnetically susceptible armature or core from the diaphragm.

The differential pressure gauge of the invention comprises a housing consisting of a housing front 20 and a housing back 21 which are united by bolts 22 and sealed against annular packing 23 which is positioned on opposite sides of a diaphragm support 24 having a central opening 25.

The diaphragm support is recessed at 26 to permit the diaphragm to move in that direction.

While the liquid whose level is measured does not enter the housing, connections to transmit pressure are provided and the gauge will preferably be mounted in the position shown although it may be placed in some other positions as desired.

The diaphragm 29 is sealed at its outer edge by the packing 23. The diaphragm may be of any suitable material but will preferably be a flexible material such as a synthetic textile fiber like Dacron impregnated with a sealing material such as neoprene. At its center the diaphragm is stiffened and supported to move as a unit by diaphragm plates 27 on opposite sides, which are held to the diaphragm by a diaphragm fitting consisting of fitting portion 28 on one side which has male threads 30 extending through central opening 31 in the diaphragm and interthreading with female threads 32 on diaphragm fitting part 33. Diaphragm fitting part 28 has a central enlarged well 34 and a reduced well extension 35 terminating in a tapered socket 36 which receives pin bearing 37 of pusher pin 38. The pusher pin extends through an opening 40 in the center of diaphragm fitting part 33, the opening 40 being small enough in diameter so that collar 41 on the pin will prevent the pin from escaping unless the fitting is disassembled.

The diaphragm is subjected to differential pressure on opposite sides through pipes 42 and 43 each of which communicates through passages 42' or 43' with the interior of the housing on opposite sides of the diaphragm. The pipes 42 and 43 also extend out the bottom of the housing.

The pressure on one of these pipes, suitably pipe 43, is a standard pressure which is equal to or greater than the highest pressure obtained on the other side at the highest liquid level (in the case of a liquid level gauge) or other gauge reading.

The pin 38 at its remote end from the diaphragm has a pin bearing 44 which engages in a conical seat recess 45 of a thimble 46 which is mounted on spring 47, suitably of leaf form. One end of the thimble forms a pin 48 which passes through an aperture in the spring and is suitably peened over to anchor with respect to the spring and hold the parts together.

The spring 47 supports a horseshoe magnet 50 and provides retardation to the movement of the diaphragm. The horseshoe magnet is conveniently fastened to the spring by the same bolts 51 which anchor a plate 52 against the side of the horseshoe magnet remote from the spring. The plate 52 has a recess 53 through which the end of the thimble 46 toward the diaphragm passes, and the thimble is flanged over at 54.

The horseshoe magnet 50 straddles a suitably tubular nonmagnetic metallic envelope or well 55, suitably of nonmagnetic stainless steel, or copper base alloy, which is anchored in the housing by threading in a recess at 56.

Coaxially with the envelope 55 and on the interior thereof is placed a helical magnetically susceptible armature 57, which is "external" to the housing and not subjected to the housing pressure, is journalled at the inner end on a bearing 58 mounted in the envelope and journalled at the outer end on a bearing 60 mounted in the envelope, the armature having shaft portions passing through the journals. The armature on its outer end carries a suitable pointer 61 which rides over a scale 62 and is counterweighted at 63. The scale is illuminated by an electric lamp illuminator 64 surrounding the housing.

The spring 47 is supported at an end between a transverse rib 65 on the interior of the housing and its cap 66 united by bolts 67. The spring is desirably slotted at the supported end at 68. The effective length of the spring which is free to deflect is varied by adjustments of a block 70 having a fulcrum edge 71 extending across the spring, the block being pivotally mounted at 72 on an adjustment screw 73 threaded in the housing in an adjustment opening which is closed by a screw closure 74. The fulcrum block 70 is moved transversely to the plane of the spring by an adjustment screw 75 threaded in the housing and having a flat cap end 76 which engages the back of the fulcrum block 70, and is enabled to move the fulcrum block toward the spring position by the slotting of the fulcrum block at 77 where it pivotally engages the end of adjustment screw 73. The adjustment opening for screw 75 is closed by cap screw 78.

Thus it will be possible to adjust the engagement of the fulcrum block 70 longitudinally of the leaf spring and also toward and away from the diaphragm, thus adjusting the effective spring lever arm.

The diaphragm fitting portion 28 on the side remote from the magnet and the spring and coaxial with the pin 38 has a magnetically susceptible armature 80 which is suitably circular in cross section and right circular cylindrical in shape, protruding out from the middle of the diaphragm. The armature 80 is surrounded by a tubular envelope 81 in spaced relation from the armature and suitably of circular cross section, coaxial with the armature. The envelope 81 is of nonmagnetic metal suitably nonmagnetic stainless steel or copper base alloy so that magnetic flux will pass through it. The envelope 81 at its inner end is flanged at 82 and seals against packing 83 in a recess 84 of the housing having female threads. The flanged envelope is sealed against the housing by packing gland 85 having external threads engaging those of the housing.

Surrounding the envelope 81 is a tubular spool 86 suitably of plastic or nonmagnetic metal having external annular recesses 87 and 88 which receive coils 90 and 91 which in one embodiment will be conventional opposed differential transformer coils.

Figure 9:
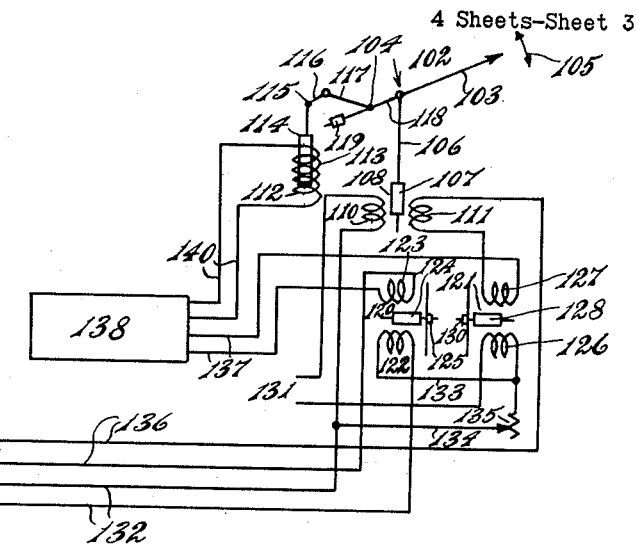
FIGURE 9 is an electric circuit diagram showing one form of remote indicator which may be connected to the differential coils in accordance with the invention.

In the preferred embodiment a single bifilar coil will be used as in FIGURE 9, where one coil 91 extending the full length includes windings 100 and 101. In this case the core moving in and out of this coil changes the inductive response which is balanced by a corresponding movement at the receiving end. The spool 86 is held in place inside the gland 85 and around the envelope 81 by stud 92 secured to the end of the envelope 81 and having threads which receive nuts 93 and washer 94 over the end of the spool.

A spring 86' holds the spool 86 in place.

The spool and the coils are desirably placed within a terminal box 95 having a terminal block 96.

Figure 5:
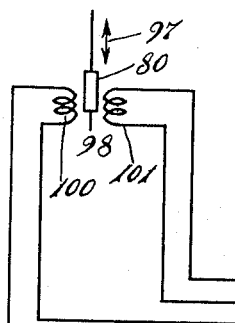
FIGURES 5 to 8 are diagrams useful in explaining the invention.
Figure 6:
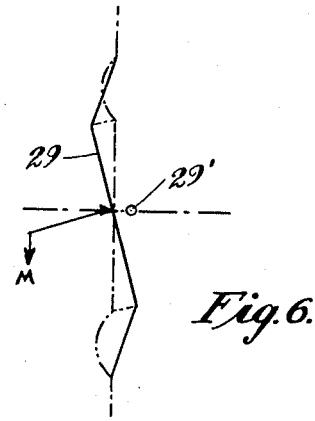

Referring to FIGURES 5 to 8, it will be apparent that if the diaphragm is free to pivot at a center 29' in or close to its own plane there is no stabilizing or compensating movement. The condition of balance is shown in FIGURE 5. With a slight unbalance of the diaphragm assembly as in FIGURE 6, it will produce a rotational effect on the resulting movement to the limit of the diaphragm slack as indicated in FIGURE 6.

Figure 7:
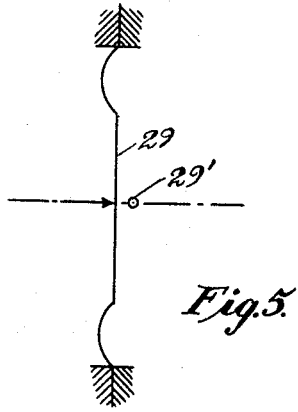
Figure 8:
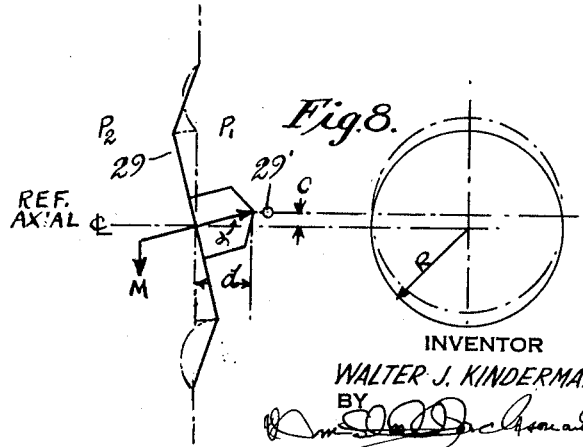

Offsetting the pivot 29' in the direction of the high pressure side of the diaphragm as indicated in FIGURE 7 introduces a stabilizing moment with rotational movement of the diaphragm assembly. Let us use the following nomenclature:

$M$ is the unbalancing moment to produce rotation
$\alpha$ is the angle of diaphragm declination
$d$ is the pivot offset from the diaphragm plane
$P_1 - P_2$ is the pressure differential across the diaphragm
$c$ is the vertical displacement of the pivot to the diaphragm centerline
$\pi r^2$ is the diaphragm area The stabilizing moment to balance $= M = (P_1 - P_2) \pi r^2 c$ $$\sin \alpha = \frac{c}{d}$$

$$c = d \sin \alpha$$

Substituting $M = (P_1 - P_2) \pi r^2 d \sin \alpha$ $\pi r^2 d$ is a design constant which we can designate as K, thus simplifying the equation to read $M = K(P_1 - P_2) \sin \alpha$ In the case of the specific indicator design under development the diaphragm area is 7 square inches and $c = \frac{1}{4}$ inch for which $K = 1.75$. The minimum value for $P_1 - P_2$ is 3 inches of water of .1 p.s.i.

Substituting for this condition $M = .175 \sin \alpha$.

If the radial clearance between the armature 80 and the well 81 = .015 inch at a 2 inch distance from the diaphragm, the limiting sin of the angle to contact $$= \frac{.015}{2} = .007$$

Introducing this we have $M_{max.} = .175 \times .007 = .001$ inch-pounds. In other words this is the moment which can be stabilized within a sufficiently small angle to maintain the armature within clearance relations within the well. (Base on accurate initial setting.)

It will be evident that with increase of the distance $d$, the stabilizing effect can be increased and that as the pressure differential increases the stabilization likewise increases in direct proportion. It will also be clear that as the clearance between the armature and well is decreased, the need for close stabilization becomes more acute. Attention is called to these variables with respect to their use as adapted to specific design requirements.

It is appropriate to point out that in view of the diaphragm slack and the suspension of the diaphragm assembly without other support there is a slight drop in the position of the diaphragm assembly with respect to the axial centerline. This can be offset at least in part by raising the initial position slightly so as to bring the assembly into accurate axial alignment under mean operating conditions. It is appreciated that as the pressure differential increases across the diaphragm this difference will diminish but since these factors are of a small order, it is possible to establish a practical mean position which satisfies practical operational requirements.

The coils 90 and 91 desirably in a suitably remote indicator circuit, of which FIGURE 9 illustrates an example invention by James W. Williams, 3d, and appearing in United States Patent Application Serial No. 733,534, filed May 7, 1958, for Remote Electrical System. This illustrates armature 80 moving in and out as suggested by the arrows 97 (FIGURE 9) through transmitting transformer 98 having a primary winding 100 and a secondary winding 101 which together are wound bifilar and form the coil 91.

At a suitable distance, which may be considerable, a secondary indicator 102 is located, having a pointer 103 pivoted on a pivot axis 104 and moving over a scale 105, the pointer being pivotally connected to a push-and-pull rod 106 which is connected to a movable magnetically susceptible armature or core 107, of a receiving transformer 108 having a primary 110 and a secondary 111, the two coils preferably being bifilar.

A motor 112, in this case a solenoid, having a coil 113 and a magnetically susceptible armature 114 is connected to the pointer in operative relation, as by a pivot connection at 115 to a crank 116 mounted on a shaft 117 which is on the pivot axis 104 and carries the pointer 103. The shaft 117 is journalled on instrument bearings not shown.

It will be evident that in the form shown in FIGURE 9 the push-and-pull rod 106 acts on the pointer on a moment arm 118 which is opposed to the moment exerted by the crank 116, and a counterbalancing force is applied to the system by a counter weight 119 acting oppositely to the moment of the pointer, but that the resultant of these moments produces a torque which tends to carry the pointer by gravity to one limiting position, in this case in the preferred form, the lower position. It will of course be evident that in designing equipment of this character, the designer is free to employ other suitable combinations of moments, desirably however producing a resultant which will bring the pointer to one limiting position whether by the action of gravity or by spring action.

Fixed but adjustable reference transformers 120 and 121 are employed which not only serve as null reference standards, but also adjust for range correlation and for zero position by cores positioned in the coils.

Whenever the armature 80 moves into the transmitting transformer coils the armature 107 moves out of the transformer coils 110 and 111, and vice versa. The range adjusting reference transformer 120 has a primary, 122, and a secondary 123, the two being preferably bifilar, and has an adjustable magnetically susceptible core or armature 124 which moves in and out and is set by a screw and nut adjustment 125. The circuit also includes a zero adjusting reference transformer 121 having a primary 126 and a secondary 127 and an adjustable magnetically susceptible core or armature 128 which is set in a fixed position by a screw adjustment 130. The primary and secondary in this case are also preferably bifilar. Thus, the two reference transformers act together additively in series to provide secondary reference output which is opposed by the output by secondary coils 101 at the transmitter and 111 at the receiver acting in the same direction.

An alternating current power source is connected at 131, suitably of 6 volts and 60 cycles, to a primary circuit 132 which includes the primary 100 of the transmitting transformer, the primary 110 of the receiving transformer, the primary 122 of the range adjusting reference transformer 120 and the primary 126 of the zero adjusting reference transformer 121, all of the primaries being in series.

The circuit branch 133, including primary 122 of the range adjusting reference transformer and primary 100 of the transmitting transformer, is shunted by a shunt circuit branch 134 including a variable resistor 135 to aid in alignment of the equipment. The secondary circuit 136 connects all of the transformer secondaries in series to input terminals 137 of amplifier 138. The polarities are important as the secondary 101 of the transmitting transformer 98 and the secondary 11 of the receiving transformer 108 are connected in one direction and are opposed by the secondary 123 of the range adjusting reference transformer 120 and the secondary 127 of the zero adjusting reference transformer 121.

The output 140 of the amplifier which is proportional to the signal unbalance in one direction is fed to the terminals of solenoid coil 112.

The operation is as follows: If the primary actuation moves armature 80 downward into the coils of transmitting transformer 98, this will increase the secondary output of secondary coil 101 and by amplification increase the output of motor coil 112 in excess of that required to maintain pointer 103 in position against gravity or other unbalance. The pointer 103 will therefore move upward in response to the increased motor coil force, and as it does so core 107 will move upward and out of the receiving transformer 108. This counteracts the original signal increase from secondary coil 101 and restores the total output from the secondaries 101 and 111 essentially to the previous value corresponding to equilibrium relationship with the reference transformer outputs and the gravity unbalance of the pointer. If the armature 80 moves upward, this reduces the secondary signal and the amplified output to the motor coil 112. This permits pointer 103 to drop correspondingly until the core 107 enters far enough into the transformer 108 to restore the signal strength from the combined transmitter and receiver secondaries.

In many cases it is desirable to mount the armature or core which controls the electrical impulse in the coils 90 and 90' on an existing differential pressure gauge without modifying the diaphragm itself or with a minimum of modification. In such cases spring mounting is very desirable.

In FIGURE 10 I show an alternate form of suspension for the transformer core 80' which would permit the conversion of existing indicator structures. It also has the advantage that it permits the interconnection of the core with the response system without special need for extreme accuracy of axial alignment of the respective components.

At opposite ends of the space within the envelope 81 I provide helical compression springs 141 and 142. Spring 141 acts between a shoulder 143 on the envelope 81 and the rear end of a head 144 which suitably has a spherical front end and is mounted integral on an extension 145 from the armature or core 80'. At the other end helical compression spring 142 acts between a spring abutment 146 resting in the bottom of the bore of the envelope 81 and a spring abutment 147 on the outer end of the armature or core 80'.

The springs 141 and 142 are desirably made of flat wire to permit axial movement at low loads and not afford resistance to lateral deformation sufficient to permit contact of the core or the spring turns on the inside of the envelope 81. The springs are preloaded sufficiently in compression to maintain contact of the head 144 with the diaphragm center fitting 28' as shown. Any misalignment of the diaphragm center with the core center will be automatically adjusted by a slight offset at the point of contact.

Since the reaction of the springs 141 and 142 is in the same direction and conforms to the direction of the pressure differential on the diaphragm, the effect is to add to the load on the deflection plate 47. All of the spring rates are straight line functions and the difference will also therefore be a straight line function of the load. It is only required therefore that the deflection plate setting be readjusted to cancel out the effect of the core springs with respect to the overall setting.

This construction has the further advantage of permitting replacement of the core member and assembly without disturbing the other working parts of the indicator.

In some cases it is preferable to divide the head 144 which engages the diaphragm fitting 28' into two components and this has been done in FIGURE 11 where the core extension 145 carries a hemispherical head 144' and a spring abutment $144^2$ working on the extension 145 retains the spring and acts against the outer end of the head 144'.

In some cases it is preferable to mount the core or armature 80' on a single rod or leaf spring 148 as shown in FIGURE 12, supporting the armature 80' cantilever fashion from the diaphragm fitting 28' by welding the end of the spring 148 into the fitting at 150. Thus the spring rod 148 is stiff axially, but permits the core to shift laterally to prevent any binding against the surrounding member 81.

Beryllium copper is a satisfactory nonmagnetic spring material for any of these forms.

It will be evident that other forms of single or double spring mountings may be used, with a spring stressed in torsion or flexure if desired.

It will be evident that the spring suspensions shown eliminate any possibility of sliding mechanical contact which might introduce retarding friction and thus preserve the basic sensitivity of the device.

In view of my invention and disclosure variations and modifications to meet individual whim or particular need will doubtless become evident to others skilled in the art, to obtain all or part of the benefits of my invention without copying the structure shown, and I therefore claim all such insofar as they fall within the reasonable spirit and scope of my claims.

It will be evident of course that the use of an indicator at the location of the differential pressure gauge is optional and that the structure can be used as a differential pressure cell alone.

Having thus described my invention what I claim as new and desire to secure by Letters Patent is:

1. In a differential pressure indicator, a housing, a vertical flexible diaphragm in the housing, separating the housing into two spaces, means for affixing the diaphragm to the housing, spring means mounted in one of the spaces and to be moved with the diaphragm, there being an opening through the middle of the diaphragm, diaphragm fitting and armature means, the latter said means including a diaphragm fitting mounted in the opening of the diaphragm, closing the opening and having a well extending interiorly beyond the diaphragm on the side remote from said spring means but open on the side toward said spring means, and said diaphragm fitting and armature means further including an armature of magnetically susceptible material extending beyond said diaphragm fitting and engaged with said diaphragm fitting to be moved forward and rearward with said fitting, the center of gravity of said diaphragm fitting and armature being located in the plane of the diaphragm, and the indicator further indicating push pin means having pin bearings at the opposite ends engaged at one end with the spring means and at the other end in the bottom of the well in the diaphragm fitting, an envelope of nonmagnetic material surrounding the armature in spaced relation and in pressure sealing engagement with the housing, and coil means surrounding the envelope.

2. An indicator of claim 1, in which the armature and diaphragm are rigidly interconnected.

3. An indicator of claim 1, in which the center of the diaphragm opening when not subjected to the weight of the diaphragm fitting and the armature is above the center of the diaphragm.

4. An indicator of claim 1, in which second spring means acts on the armature and holds the armature into interconnection with the diaphragm fitting.

5. An indicator of claim 4, in which the second spring means acts between the envelope and the armature at both ends of the armature.

6. An indicator of claim 4, in which the armature includes a head of ball formation engaging the fitting.

7. An indicator of claim 4, in which the second spring means comprises a rod type spring supporting the armature cantilever fashion.

References Cited in the file of this patent
UNITED STATES PATENTS

| | | | |
|---|---|---|---|
| 2,509,644 | 5/50 | Kinderman | 73—317 |
| 2,564,221 | 8/51 | Hornfeck | 336—30 X |
| 2,627,183 | 2/53 | Greenwood | 336—30 X |
| 2,664,749 | 1/54 | Jones | 336—30 X |
| 2,740,941 | 4/56 | Kelly | 336—30 |
| 2,764,646 | 9/56 | Young | 336—30 |
| 2,814,312 | 11/57 | Booth et al. | 336—30 |

ORIS L. RADER, MILTON O. HIRSHFIELD, E. JAMES SAX, JOHN P. WILDMAN, JOHN F. BURNS, *Examiners*.